United States Patent [19]

Royce

[11] Patent Number: 5,688,839
[45] Date of Patent: Nov. 18, 1997

[54] MARBLEIZED RESIN MATERIALS AND METHODS FOR MAKING SAME

[75] Inventor: Wylie H. Royce, Colts Neck, N.J.

[73] Assignee: Royce Associates, East Rutherford, N.J.

[21] Appl. No.: 688,405

[22] Filed: Jul. 30, 1996

[51] Int. Cl.$^6$ ........................ C09D 5/29
[52] U.S. Cl. ............... 523/171; 524/431; 524/495; 524/496
[58] Field of Search ............... 523/171; 524/495, 524/496, 431

[56] References Cited

U.S. PATENT DOCUMENTS

| | | | |
|---|---|---|---|
| 2,921,006 | 1/1960 | Schmitz et al. | 204/154 |
| 3,787,280 | 1/1974 | Conger et al. | 161/168 |
| 3,906,065 | 9/1975 | Schneider et al. | 264/40 |
| 4,048,101 | 9/1977 | Nakamachi et al. | 260/2.5 E |
| 4,544,584 | 10/1985 | Ross et al. | 428/15 |
| 5,232,644 | 8/1993 | Hammond et al. | 264/73 |
| 5,244,942 | 9/1993 | Hover et al. | 523/171 |
| 5,368,919 | 11/1994 | Robeson | 428/224 |
| 5,387,381 | 2/1995 | Saloom | 264/75 |
| 5,439,949 | 8/1995 | Lucas et al. | 522/157 |
| 5,508,318 | 4/1996 | Comer | 522/112 |
| 5,508,319 | 4/1996 | DeNicola, Jr. et al. | 522/161 |

*Primary Examiner*—Edward J. Cain
*Attorney, Agent, or Firm*—Wiggin & Dana

[57] ABSTRACT

The present invention relates to a mixture of different colored resin particles, some or all of which are irradiated. The present invention also relates to the process of making a marbleized resin composite from this mixture of colored resin particles, as well as the marbleized composite product. The marbleized resin material of the invention displays sharp color delineation between each colored component.

24 Claims, No Drawings

1

MARBLEIZED RESIN MATERIALS AND METHODS FOR MAKING SAME

BACKGROUND OF THE INVENTION

1. Field of the Invention

The present invention relates to a mixture of different colored resin particles, some or all of which are irradiated. The present invention also relates to the process of making a marbleized resin composite from this mixture of colored resin particles, as well as the marbleized composite product.

2. Brief Description of Art

The widespread use of plastic articles has led manufacturers to devise a number of methods of making such articles more aesthetically pleasing. It is often desirable to color various products formed from resinous plastics, such as polyethylene, polypropylene, polystyrene, and the like. Paints, coatings, and similar surface coloration methods have been largely unsatisfactory due to the lack of adhesion between the polymer resin and the paint or coating. Resinous materials have been decorated with striations, wood-graining, mosaics, burnishing, wrinkles, and the like. These effects are produced by either a treatment step after the surface coating has been laminated to a substrate, or by means of various additives to the resinous blend at the time of formation.

Alternative methods of coloring polymeric resins include mixing colored particles into the resin before extrusion or processing. For example, U.S. Pat. No. 3,906,065 to Schneider et al. discloses a process for the manufacture of shaped marbled thermoplastic products formed by alternatively extruding two batches of a differently colored resin agglomerate. However, artistic variations of the coloring are not generally possible with this method because the extrusion temperature of the mixture is high enough to cause the color particles to melt and mix homogeneously with the resin. This results in blending of the colors without clear and distinct demarcations between the colors.

Chemical crosslinking agents such as organic peroxides (e.g., benzoyl peroxide) have been added to improve color separation. U.S. Pat. No. 3,787,280 to Conger et al. discloses marbleized resin products having sharp color definition made by extruding a blend of thermoplastic resinous chips which are formed from a chemically crosslinked polymer and chips of a plasticized thermoplastic resin free of crosslinking. The mixture is heated and formed into sheets. However, residual crosslinking reagent remains after processing. Thus, this approach is not desirable for products which come in contact with food, or are handled.

Separately, irradiation and resulting crosslinking of resins for other purposes is known. Examples of teachings showing irradiation of resins are as follows, and each reference is incorporated herein by reference it its entirety.

U.S. Pat. No. 5,508,319 to DeNicola, Jr. et al. discloses electron beam irradiation of high density polyethylene pellets. Other polymers and additives, such as pigments, can be added after irradiation occurs. However, addition of pigments after irradiation can result in bleeding of the pigment into a surrounding colored or uncolored polymer.

U.S. Pat. No. 5,508,318 to Comer discloses blends of irradiated and non-irradiated polyolefins, such as high density polyethylene that exhibit improved properties. Additives such as pigments may be added after irradiation. However, like DeNicola, Jr. et al., addition of pigments after irradiation may result in the pigment bleeding into the surrounding non-irradiated polymer. The bleeding of pigment from the irradiated polymer results in blending of the colors without a sharp definition between the colors.

U.S. Pat. No. 5,439,949 to Lucas et al. discloses blends of irradiated and non-irradiated polymers. The polymers are blended in an uncolored state.

U.S. Pat. No. 5,368,919 to Robeson discloses blends of irradiated and non-irradiated propylene polymers. As an alternative to an irradiation treatment, a chemical crosslinker may be used. Conventional additives, such as pigments, may be added to the mixture after chemical crosslinking or irradiation. However, addition of pigments after irradiation may result in the pigment bleeding into the surrounding non-irradiated polymer.

Accordingly, there is still a need in the colored resin end-product art for a better way to produce colored resin end products with a marbleized appearance. The present invention provides a solution to that need.

BRIEF SUMMARY OF THE INVENTION

One aspect of the present invention is directed to a mixture of colored resin particles useful for making a marbleized resin composite, comprising an admixture of either (1) at least two types of colored accent resin particles wherein each type of particles is of a different color and is irradiated; or (2) at least one type of colored accent resin particles mixed with at least one type of background resin particles wherein each colored accent resin particle type is irradiated and each background resin particle type is not irradiated, and wherein each colored accent resin particle type is a different color from the other colored accent particle types and the background particle types.

Another aspect of the invention is directed to a method of making a marbleized resin composite comprising compounding together an admixture of either (1) at least two types of colored accent resin particles wherein each type of particles is of a different color and is irradiated, or (2) at least one type of colored accent resin particles mixed with at least one type of background resin particles, wherein each colored accent resin particle type is irradiated and each background resin particle type is not irradiated, and wherein each colored accent resin particle type is a different color from the other colored accent resin particle types and from the color of the background resin particle types.

Another aspect of the present invention is the marbleized composition produced by the above described method.

DESCRIPTION OF THE PREFERRED EMBODIMENTS

As used herein, the term "marbleized" and "marbleized appearance" refers to a distinctive and vivid separation of colors in a resin composite product. The terms "type of background resin particles" or "type of background resin component" as used in the present specification and claims are defined as any resin (optionally combined with colorant) in any physical shape, including powders, particulates, or pellet forms, which are not irradiated. If no colorant is added to the background resin, then the color of each type of background resin particles or component will be the natural color of that particular resin. Each type of background resin may, but not necessarily, be different from other types of background resin.

The terms "type of colored accent resin particles" and "type of colored accent resin component" as used in the present specification and claims are defined herein as any combination of colorant and resin in any physical shape, including powder, particulate, or pellet forms, which are irradiated after being combined. As mentioned above, each type of colored accent resin particle or component will be a different color than the other different types of colored accent resin particles.

The resin used in the background component may be any resin known in the art, such as low density polyethylene, polystyrene, polypropylene, acrylic, polycarbonate, acrylonitrile-butadiene styrene copolymer (ABS copolymer), styrene-acrylonitrile polymer (SAN polymer), nitrile acrylic styrene copolymer (NAS), and the like.

The accent component resin may be any resin known in the art that is capable of crosslinking when exposed to high energy radiation. Preferably, the accent resin is high density blow molding grade polyethylene (HDPE). Other suitable accent resins include polyester, polyvinylchloride (PVC), polyvinyl dichloride (PVDC), "SURLYN" copolymers (ionomer resins), polypropylene, ethylene vinyl acetate (EVA), nylon, polycarbonate and other forms of polyethylene such as LDPE and LLDPE. The polymer chains of this resin material crosslink to each other upon exposure to electron beam or gamma radiation through a primary valence bond. The melt index of the colored accent resin is preferably about 0.3 gm/10 min. Melt index is measured by ASTM Standard D1238 and describes the relative flowability of the resin at a given temperature. The density is preferably in the range of 0.952 to 0.954 grams per cubic centimeter (g/cc).

Colorants useful in accent component of the invention include conventional inks and pigments used in plastics, such as titanium dioxide (for a white color), carbon black, phthalocyanine blue, iron oxide brown colorant, Pigment Yellow 62, or other colorant known in the art. These colorants, as well as other colorants, such as Solvent Blue 36 and Solvent Yellow 33, may also be used in the background component. It will be appreciated by those skilled in the art that the invention may be practiced with any number of colors in the accent component, and is not limited to just a single background color and single accent color. In fact a camouflage appearance can be achieved by using two or more irradiated accent components without a background component (see Example 3).

Preferably, the resin in the background component comprises about 60% to about 100% by weight of the background component, and more preferably about 70% to about 90% by weight. If used, colorants in the background component may vary from 5% to 40% by weight of the background component depending on the end color and letdown ratio desired.

Preferably, the resin in the colored accent component comprises about 60% to about 95%, and more preferably about 70% to about 80% by weight of the total accent component. The colorant concentration in the accent component is preferably in the range of about 5% to 40% by weight, and most preferably about 10% to 20% by weight.

The colored accent component or the background component or both of the invention preferably include other minor ingredients, such as dispersing agents (e.g., zinc stearate), waxes, antioxidants, UV light inhibitors, stabilizers, extender oils, fillers, flame retardants, or other additives known in the art. Any of these minor ingredients may be used in amounts up to 5% by weight of the component. The purpose of a dispersing agent, such as zinc stearate, is to aid in evenly dispersing the colorants throughout the resin.

The background particles and the colored accent particles are made using similar methods. The background particles are manufactured using a selected resins and selected colorant(s) as mentioned above.

Preferably, the resin chosen for the background particles is compatible with and has a higher melt flow than the natural resin it will be dispersed into to color. In one preferred embodiment, the chosen background resin and the chosen colorant(s) are dry-mixed in a blender or other mixing device, and fed into a compounding extruder. The compounding extruder further disperses the colorants, melts the resin, and blends the colorants and the resin into a uniformly colored product. The resin exits the extruder either in strands or into a pelletizer at the die head to form pellets, particles, or powders of colored background component.

Most preferably, colored accent particles are made by combining the colorant with high density blow molding grade polyethylene or another resin that crosslinks upon exposure to irradiation. The polyethylene and the colorant(s) are dry mixed in a standard blender and fed into a compounding extruder. The compounding extruder disperses the polyethylene resin and the colorant becomes encapsulated within in the dispersed resin. Colored accent particles exit the extruder either in strands, pellets, or particles.

After the colored accent particles are extruded, they are subjected to about 2 to 5 megarads of electron beam or gamma radiation. 3.5 megarads of electron beam radiation is the most preferable dose of radiation for HDPE accent pellets. The radiation crosslinks the polymer chains, increases the molecular weight of the polyethylene matrix, and lowers the melt flow of the finished product to a level that is not measurable by standard analysis techniques, such as ASTM D1238.

Preferably, irradiation is performed using an electron beam or gamma radiation accelerator. The end product is colored accent particles with a melt index sufficiently low so that when it is molded with the background component, the accent component only partially disperses. The partial dispersal of the accent component provides the clear, sharp color differentiation that is characteristic of the marbleized products of the invention.

Ionizing radiation may consist of gamma rays or an electron beam. Ionizing radiation is measured in rads, and is normally expressed in megarads (Mrads) or millions of rads. Gamma rays may be provided from radioactive materials such as cobalt 60 and are highly penetrating but have a relatively slow process rate. Ionizing radiation may also be provided in the form of an electron beam from an electron beam accelerator which is normally characterized by the accelerator voltage and the electron beam current, or as the rate at which radiation is delivered.

Irradiation methods for crosslinking the polymer resin are preferred over chemical crosslinkers because chemical crosslinkers may leave unwanted impurities or residual crosslinking agent in the final marbleized material, and the level of crosslinking is not easily controlled. Irradiation methods of crosslinking permit the degree of crosslinking to be precisely controlled by adjusting the level of radiation. As will be appreciated by those skilled in the art, the conditions for irradiation will vary depending on the degree of crosslinking required and the type of material to be crosslinked. The conditions for obtaining the proper degree of crosslinking in any particular application can be determined by those of ordinary skill in the art without undue experimentation.

In one preferred embodiment of the present invention, the particles of a colored, nonirradiated background component and irradiated colored accent component are preferably blended into a colorless natural resin. The colorless natural resin may be 8 melt high impact polystyrene (HIPS) natural resin or 8 melt 0.954 grams per cubic centimeter high density polyethylene natural resin, or 20 melt polypropylene homopolymer. A typical ratio of the colored, nonirradiated background component and irradiated colored accent component to the colorless natural resin is 0.5% to 5% by weight each (0.5–5% letdown ratio). In other words, this preferred final blended resin product will be made from 0.5 to 5% by weight colored accent resin component, 0.5 to 5% by weight colored background component, and 90 to 99% by weight colorless natural resin.

The composition of the present invention can be prepared according to conventional methods, for example, mixing the background component and accent component, as well as well-known additives, in a blender, such as a Henschel or Banbury mixer, to uniformly disperse the ingredients, at a temperature equal to or exceeding the polymer softening temperature, then extruding the mixture.

During extrusion and molding, the colorants of the background component are dispersed throughout the colorless natural resin creating the desired background color. The accent particles, on the other hand, do not disperse as readily through the colorless natural resin due to the crosslinked nature and higher dispersal (melt) temperature of the polymer chains while the colored background particles are readily dispersed through the colorless natural resin. This differential in rate of dispersion creates the marbleized appearance of the product. The marbleized resin composites made from the method of the invention exhibit sharp separation between each color, with little or no blending between the selected accent or background colors. Such a marbleized appearance is desirable in a variety of products, such as housewares, flower pots, children's toys, pet toys, cosmetic packaging, advertising specialties, and the like.

Injection molding is a preferred technique to make marbleized resin articles. In addition, a streaking effect can be achieved by film extrusion or in sheet extrusion. Moreover, by using only 0.5% to 1% of accent color, a wood grain effect can be achieved in materials used as plastic lumber or siding.

The following examples illustrate the method of the invention, but are not intended to limit the scope of the invention. All parts and percentages are by weight and all temperatures are in degrees Celsius unless explicitly stated otherwise.

EXAMPLE 1

Green Background with White accent in High Impact Polystyrene

A green color background component of injection molding grade high impact polystyrene (HIPS) was marbleized with a white accent component. The background component contains the following ingredients:

| Ingredient | Amount (g) |
| --- | --- |
| Titanium dioxide | 150 g |
| Phthalocyanine blue | 11 g |
| Solvent Blue 36 | 2.5 g |
| Solvent Yellow 33 | 4.5 g |
| Zinc stearate | 13.5 g |
| HIPS | 726.5 g |

The HIPS was 9 melt as measured by ASTM method D1238. These ingredients were blended in a standard blender and fed into a compounding extruder to produce a finished, pelletized background color component.

The white accent component is produced using the following:

| INGREDIENTS | AMOUNT |
| --- | --- |
| Titanium dioxide | 181 g |
| Zinc stearate | 13.5 g |
| .3 melt HDPE (.952 g/cc) | 726.5 g |

These ingredients are blended and fed into a compounding extruder to produce a white finished pelletized accent color component in pellet form. The accent component pellets are then subjected to 3.5 megarads of radiation in a 10 million volt electron beam machine (50 kilowatt IMPELA accelerator manufactured by AECL of Canada).

The green and white components are blended equally (about 2 pounds each), and then blended into 100 pounds of natural 8 melt HIPS natural resin. The mix is molded in a 50 ton injection molding machine with a standard dispersion screw to form desired shapes. The finished product displays a marbleized appearance having a deep green background color with clearly delineated streaks and whorls of clear white, particularly at the surface, and very little bleeding between the colors.

EXAMPLE 2

Blue Background with White accent in High Density Polyethylene

A blue background component made from 20 melt low density polyethylene (LDPE) is made using the following:

| Ingredients | Amount |
| --- | --- |
| Titanium dioxide | 150 gms. |
| Phthalocyanine Blue | 15 gms. |
| Zinc Stearate | 13 gms. |
| 20 melt LDPE | 1,184 gms. |

The mixture is blended and extruded as described in Example 1. The white accent component is manufactured and irradiated as described in Example 1.

To produce the marbleized product, about 2 pounds of the white accent component is blended into about 3 pounds of the blue background component. The 5 pound combination of background component and accent components is then blended into 100 pounds of 8 melt 0.954 density high density polyethylene natural resin. The blend is then molded in a 50 ton screw type injection molding machine as described in Example 1. The finished product displays marbleized appearance having a blue background color with clearly delineated streaks and whorls of clear white, particularly at the surface, and very little bleeding between the colors.

EXAMPLE 3

Camouflage in Polypropylene

A camouflage pattern may be molded into plastic articles using the method of the invention. Four colored components (beige, green, brown, and charcoal) are processed, irradiated, and blended together to create a camouflage appearance. The composition consists of the following:

| | | |
|---|---|---|
| Beige Component: | Titanium dioxide | 120 g |
| | Iron Oxide Brown | 60 g |
| | Zinc Stearate | 13 g |
| | HDPE | 715 g |
| Green Component: | Titanium dioxide | 100 g |
| | Phthalocyanine Blue | 13 g |
| | Pigment Yellow 62 | 4 g |
| | Zinc Stearate | 13 g |
| | HDPE | 820 g |
| Brown Component: | Iron Oxide Brown | 75 g |
| | Zinc Stearate | 13 g |
| | HDPE | 820 g |
| Charcoal Component: | Titanium dioxide | 10 g |
| | Carbon Black | 80 g |
| | Zinc Stearate | 13 g |
| | HDPE | 805 g |

In each colored component, the resin was 0.3 melt HDPE with a density of 0.952 grams per cubic centimeter.

Each colored component is blended and extruded as described in the above Examples. Each extruded composition is then subjected to about 3.5 megarads of radiation in a 10 million volt electron beam machine.

About two pounds of each component are blended together, and mixed into 100 pounds of 20 melt polypropylene homopolymer as a natural resin. The blend is molded in a 50 ton screw-type injection molding machine to produce molded resins. The final product has a marbleized camouflage appearance with many clearly delineated swirls of beige, brown and black on a substantially olive background.

Although the invention has been shown and described with respect to illustrative embodiments thereof, it should be appreciated that the foregoing and various other changes, omissions and additions in the form and detail thereof may be made without departing from the spirit and scope of the invention as delineated in the claims. All patents and patent applications mentioned are herein incorporated by reference in their entirety.

What is claimed is:

1. A mixture of colored resin particles useful for making a marbleized resin composite, comprising an admixture of either:

(1) at least two types of colored accent resin particles wherein each type of particle is of a different color and is irradiated; or (2) at least one type of colored accent resin particles mixed with at least one type of background resin particles, wherein each colored accent resin particle type is irradiated and each background resin particle type is not irradiated, and wherein each colored accent resin particle type is a different color from the other colored accent particle types and the background particle types.

2. The mixture of claim 1, wherein the resin used to make each colored accent particle type is high density polyethylene.

3. The mixture of claim 1, wherein the colorants used to make each colored accent particle type is selected from the group consisting of titanium dioxide, carbon black, phthalocyanine blue, iron oxide brown colorant, and Pigment Yellow 62.

4. The mixture of claim 1, wherein the resin used in each background resin particle type is selected from the group consisting of polystyrene, polyethylene, polypropylene, acrylonitrile-butadiene styrene copolymer, styrene-acrylonitrile polymer, polyvinylchloride, nitrile acrylic styrene copolymer, acrylic, and polycarbonate.

5. The mixture of claim 1, wherein at least one type of background resin additionally contains a colorant and that colorant is selected from the group consisting of titanium dioxide, carbon black, phthalocyanine blue, iron oxide brown colorant, Pigment Yellow 62, Solvent Blue 36, and Solvent Yellow 33.

6. The mixture of claim 1, wherein said admixture comprises at least two types of colored accent resin particles wherein each type of particle is of a different color and is irradiated.

7. The mixture of claim 1, wherein said admixture comprises at least one type of colored accent resin particles mixed with at least one type of background resin particles, wherein each colored accent resin particle type is irradiated and each background resin particle type is not irradiated, and wherein each colored accent resin particle type is a different color from the other colored accent particle types and the background particle types.

8. The mixture of claim 1, wherein at least one type of colored accent resin particles or at least one type of background particles include additives selected from the group consisting of dispersing agents, waxes, antioxidants, UV light inhibitors, stabilizers, extender oils, fillers, and flame retardants.

9. A method of making a marbleized resin composite, comprising:

compounding together an admixture of either (1) at least two types of colored accent resin particles wherein each type of particles is of a different color and is irradiated; or (2) at least one type of colored accent resin particles mixed with at least one type of background resin particles, wherein each colored accent resin particle type is irradiated and each background resin particle type is not irradiated, and wherein each type of colored accent resin particles is a different color from the other colored accent resin particles and from the color of the background resin particles.

10. The method of claim 9, wherein the resin used to make each colored accent particle type is high density polyethylene.

11. The method of claim 9, wherein the colorants used to make each colored accent particle type is selected from the group consisting of titanium dioxide, carbon black, phthalocyanine blue, iron oxide brown colorant, and Pigment Yellow 62.

12. The method of claim 9, wherein the resin used in each background resin particle type is selected from the group consisting of polystyrene, polyethylene, polypropylene, acrylonitrile-butadiene styrene copolymer, styrene-acrylonitrile polymer, polyvinylchloride, nitrile acrylic styrene copolymer, acrylic, and polycarbonate.

13. The method of claim 9, wherein at least one type of background resin additionally contains a colorant and that colorant is selected from the group consisting of titanium dioxide, carbon black, phthalocyanine blue, iron oxide brown colorant, Pigment Yellow 62, Solvent Blue 36, and Solvent Yellow 33.

14. The method of claim 9, wherein said admixture comprises at least two types of colored accent resin particles wherein each type of particle is of a different color and is irradiated.

15. The method of claim 9, wherein said admixture comprises at least one type of colored accent resin particles mixed with at least one type of background resin particles, wherein each colored accent resin particle type is irradiated and each background resin particle type is not irradiated, and wherein each colored accent resin particle type is a different color from the other colored accent particle types and the background particle types.

16. The method of claim 9, wherein at least one type of colored accent resin particles or at least one type of background particles include additives selected from the group consisting of dispersing agents, waxes, antioxidants, UV light inhibitors, stabilizers, extender oils, fillers, and flame retardants.

17. The method of claim 9, wherein said resin of said background resin particles comprises about 60 to about 100 percent by weight.

18. The method of claim 9, wherein the colorant in said background resin particles comprises from about 5 to about 40 percent by weight of said background resin particles.

19. The method of claim 9, wherein said dispersing agent is zinc stearate.

20. The method of claim 9, wherein said resin of said colored accent resin particles comprises about αto about 90 percent by weight of said accent resin particles.

21. The method of claim 9, wherein the colorant of said colored accent resin particles comprises from about 10 to about 25 percent by weight of said colored accent resin particles.

22. The method of claim 9, wherein said irradiation is carried out with electron beam radiation.

23. The method of claim 9, wherein said irradiation is carried out with gamma radiation.

24. A marbleized resin material made from the method of claim 9.

* * * * *